March 17, 1970   J. H. BOYNTON ET AL   3,501,179
HELICALLY CORRUGATED SPIRAL PIPE AND COUPLING THEREFOR
Filed Aug. 1, 1968   2 Sheets-Sheet 1
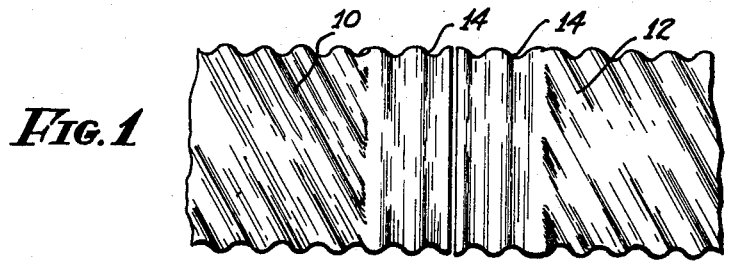
FIG. 1
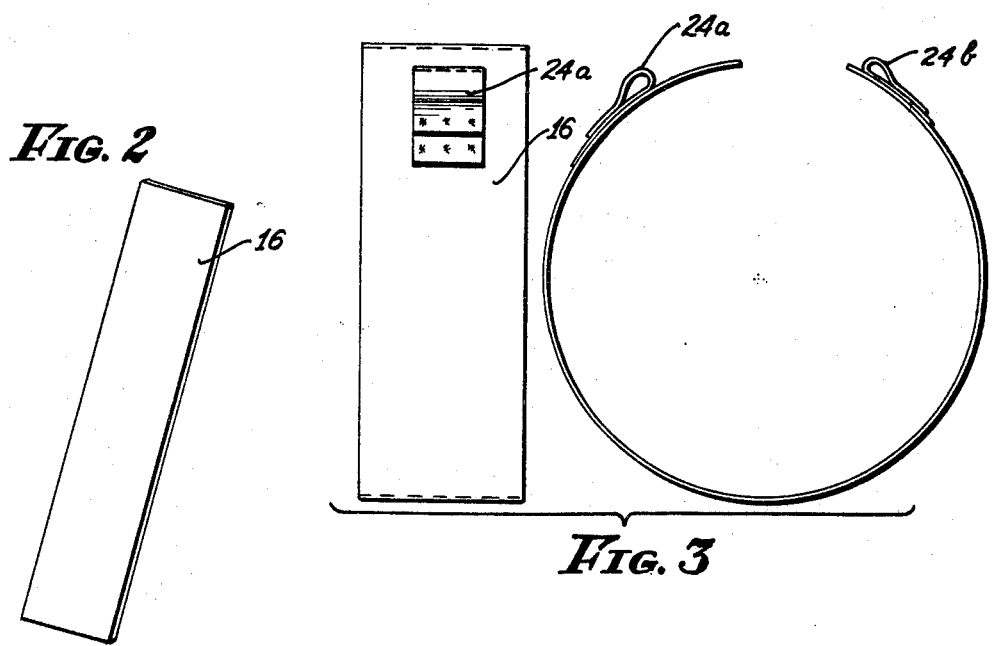
FIG. 2
FIG. 3
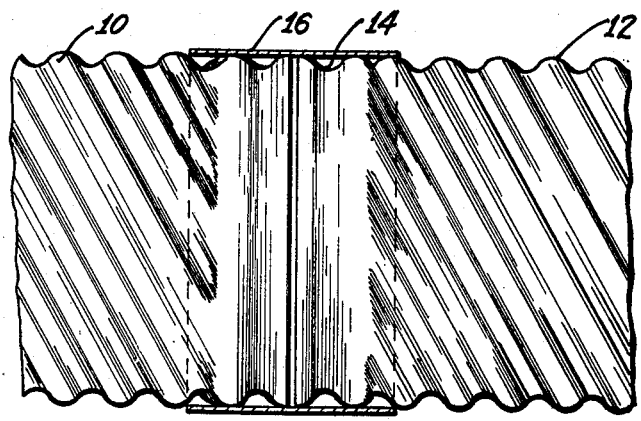
FIG. 4
INVENTOR/S
JERALD H. BOYNTON,
DALE D. FELTON &
JOSEPH MOFFA
BY *Melville, Strasser, Foster and Hoffman*
ATTORNEYS

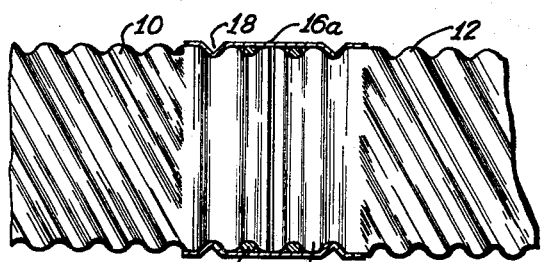
FIG. 6
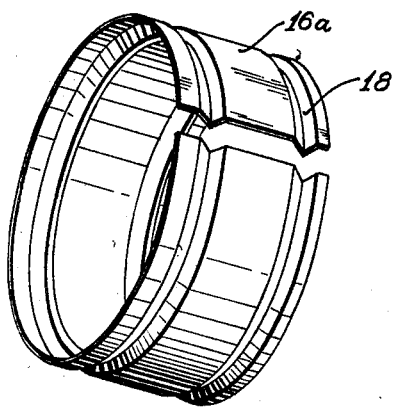
FIG. 5
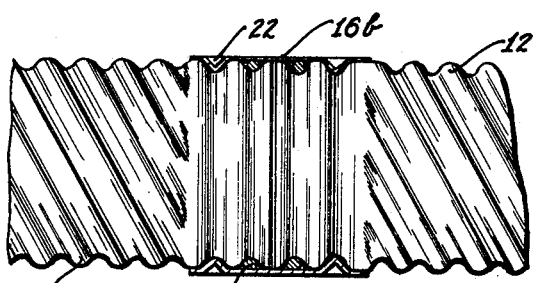
FIG. 8
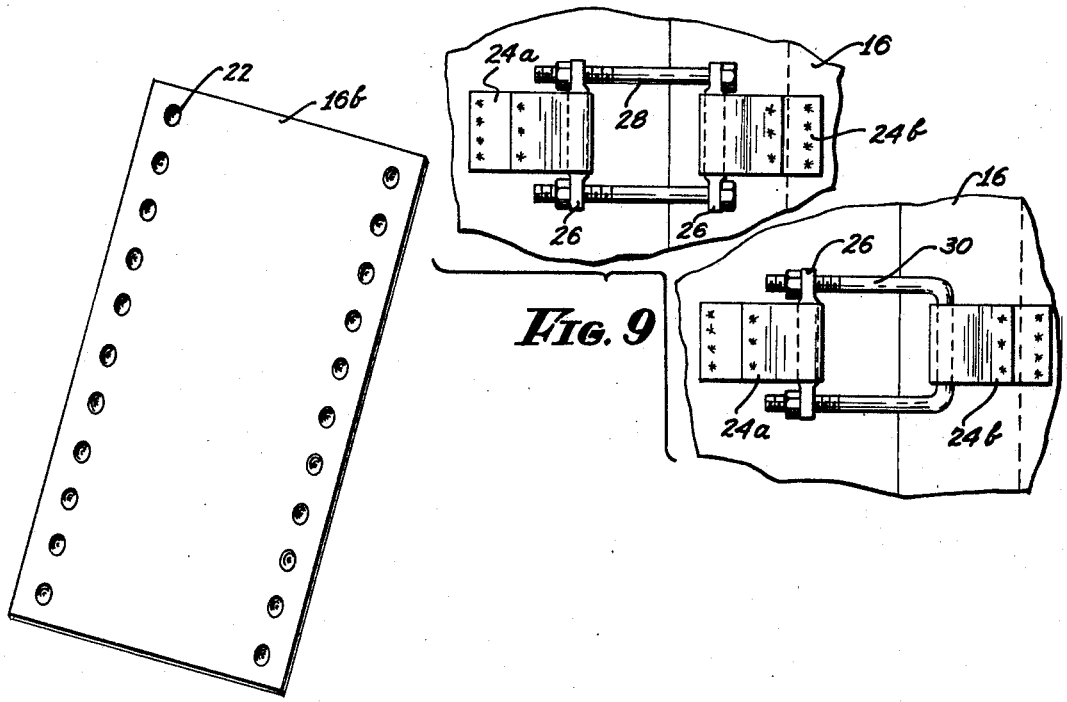
FIG. 7
FIG. 9
INVENTORS
JERALD H. BOYNTON,
DALE D. FELTON &
JOSEPH MOFFA
BY Melville, Strasser, Foster and Hoffman
ATTORNEYS United States Patent Office 3,501,179
Patented Mar. 17, 1970

1

3,501,179
HELICALLY CORRUGATED SPIRAL PIPE AND COUPLING THEREFOR
Jerald H. Boynton, Franklin, and Dale D. Felton and Joseph Moffa, Middletown, Ohio, assignors to Armco Steel Corporation, Middletown, Ohio, a corporation of Ohio
Filed Aug. 1, 1968, Ser. No. 749,418
Int. Cl. F16l *21/02, 19/00, 17/00*
U.S. Cl. 285—373                           13 Claims

ABSTRACT OF THE DISCLOSURE

An improved helically corrugated, spiral pipe for use with coupling means to provide a substantially soil tight joint, the pipe being provided with at least one annular, circumferentially continuous, corrugation at each end thereof, the crests adjacent the annular corrugations being adapted for sealing purposes and providing continuous surface-to-surface seals with the coupling means about the entire circumference of the pipe.

BACKGROUND OF THE INVENTION

Field of the invention

This invention relates to pipe couplings, and more particularly, to couplings of the type used for joining sections of butt welded, helically corrugated, spiral pipe.

Description of the prior art

The use of helically corrugated, spiral pipe has increased due to the myriad new applications and modifications which have been developed. However, basic couplings for joining the foregoing pipe sections have generally proved unsatisfactory.

In general, most applications of helically corrugated, spiral pipe require that the pipe be soil tight and convey water without gross leakage. This means that the pipe, while not necessarily water-tight, nevertheless must not permit water to leak or flow out through a joint at such a volume and velocity as to cause undue settling or erosion of the soil surrounding the pipe. Furthermore, if the pipe is to be laid below the water table, most applications require that the pipe joints preclude ingress of water. Pipe joints must also provide sufficient strength to maintain the proper alignment of the joined pipe sections throughout the life of the pipe. In joining adjacent sections of helically corrugated, spiral pipe, the prior art has found that the corrugations of the pipe sections to be joined and the corrugations of band-type coupling means must all be of substantially the same pitch, size and depth. Furthermore, these corrugations must be aligned so that the band can properly seat on the pipe section ends. In order to achieve this end, often one of the pipe sections must be revolved about its axis, or longitudinal movement of one pipe section with respect to the other pipe section is required. Rotational movement of one pipe with respect to the other pipe is very time consuming and not practical, or cannot be tolerated if the pipe is of large diameter or is either paved in the bottom or noncircular in cross section, such as a pipe arch. Longitudinal movement of one pipe with respect to the other pipe also has proven to be impractical because the gap between the ends of the two pipe sections could become critical if a large diameter pipe is moved longitudinally. Accordingly, the coupling must necessarily carry all of the load across the pipe. For example, there may be a gap greater than 3 inches between 12 inch diameter helically corrugated pipe sections. Such a gap may obviously cause failure of the coupling and a disruption in flow characteristics.

2

Various prior art coupling have been utilized to join helically corrugated spiral pipe, but they have generally proven to be unsatisfactory. For example, the coupling disclosed in U.S. Letters Patent No. 3,239,254, in the name of George L. Campbell, and which is exemplary of the prior art, utilizes indentations which conform with the troughs of the corrugations on the abutting sections of helically corrugated pipe. However, this coupling has proven to be unsatisfactory because the indentations do not provide a soil tight pipe joint and the coupling cannot be tightened unless the substantially aligned and abutting lengths of helically corrugated pipe sections are accurately positioned relative to each other. The helical corrugations of one of the lengths must be aligned with the helical corrugations of the other of the lengths so as to form substantially continuous corrugations across the joint. Accordingly, one pipe section must either be substantially rotated or moved longitudinally with respect to the other pipe section.

It should also be pointed out that a basic requirement of the Campbell coupling, that each indentation on the coupling precisely conform to the trough of the corrugation on the abutting pipe which it engages, whereby a soil tight and water tight pipe joint is produced, is also unsatisfactory in that there is little degree of lateral movement of the two pipe sections after the coupling has been placed on the pipe joint. Accordingly, the pipe sections are precluded from deflecting so as to conform to the contour of the land or trench on which they are placed.

A further example of prior art pipe couplings is disclosed by U.S. Letters Patent No. 3,315,991, in the name of P. K. Davis. There each coupling includes a plurality of elongated, resilient sealing strips so that the pipe joints will be both soil tight and water tight. However, Davis does not really achieve a soil tight and water tight pipe joint on helically corrugated pipe because the resilient strips are in the form of annular gaskets which do not fully conform to their respective pipe corrugations, but instead hang up on the crest of each corrugation and leave a gap in the depression or trough of each corrugation because they continuously stretch on the down slope side thereof when tightened.

SUMMARY OF THE INVENTION

The present invention provides a pipe joint comprising a pair of substantially axially aligned abutting lengths of butt welded, helically corrugated, spiral pipe, the abutting ends of each pipe being provided with at least one annular corrugation. The outside diameter of each annular corrugation is substantially identical with the maximum outside diameter of its helically corrugated pipe length. A coupling band encircles the adjacent ends of the lengths of pipe and means are provided for tensioning the ends of the band together. The band has a predominantly flat cross section and is of a width to provide a continuous surface to surface seal about the entire circumference of each abutting length of pipe at at least two points thereon.

The pipe joint may also be provided with at least one deformation near each circumferential edge of the band. The deformations engage annular corrugations on each of the abutting ends of the spiral pipes to be joined and preclude the pipe sections from pulling out of the band.

The aforementioned deformations may, of course, engage any annular corrugation on the end of each pipe, but preferably they engage the innermost annular corrugation on each end. The deformations may comprise at least one annular corrugation or at least one row of indentations.

Additionally, pipe joints according to the present invention may include a resilient ring, preferably an O-ring, positioned in an annular corrugation on an abutting end of each pipe. The resilient ring is such that it cannot extrude out of its corrugation and such that it is contiguous with the underside of the band when the ends of the band are tensioned together.

The means for tensioning the ends of the band together may comprise a loop attached to each end of the band. Preferably, the loops are attached to the band far enough from the ends thereof so as to provide overlapping of the ends when the ends are tensioned together. A bar member is provided in each loop and bolt means are utilized to draw the bar members together. In lieu of a bar member in one loop, a U-shaped bolt may be used. The line of tension in the bolt means or U-shaped bolt is preferably close to the surface of the band, thus precluding the band from raising off the abutting pipe ends when the ends are tensioned together.

The present invention also provides a butt welded, helically corrugated, spiral pipe for use with coupling means. Each end of the pipe is provided with at least one annular corrugation. The outside diameter of each corrugation is substantially identical with the maximum outside diameter of the helically corrugated, spiral pipe. Accordingly, the ends of the pipe are protected from crushing, and at least two annular surfaces are provided at each end of the pipe which furnish a continuous surface to surface seal with the coupling means about the entire circumference of the pipe and provide enhanced shear resistance at the joint.

The pipe joint of the present invention is easily assembled without rotating one of the abutting sections, and the band may be satisfactorily positioned substantially abutting the pipe sections because the distance between the annular corrugations is constant regardless of orientation and equals the distance between deformations on the band. The annular corrugations allow more play in the pipe joint when the ends of the band are tensioned together and provide enhanced separation resistance and generally reinforce the pipe ends against damage.

The pipe joint of the present invention eliminates the myriad problems heretofore present in joining helically corrugated paved pipe or deformed pipe as well as the problems created by the substantial gap between the abutting ends.

The pipe joint of the present invention is substantially soil tight because of the surface to surface seal about the entire circumference of the abutting ends of the pipe, and it is substantially water tight if the resilient rings are utilized. The resilient rings also allow for lateral movement of the pipe sections, in the amount of 3° to 5°, so that they may conform to the contour of the land on which they are laid.

The band of the pipe joint of the present invention is not bulky or difficult to handle and does not require a substantial labor time for installation. Additionally, it is more easily and less expensively manufactured than prior art couplings. Furthermore, the pipe joint is soil tight and water tight and still retains the amount of angular movement necessary for the pipe sections to substantially conform to the contour of the land.

BRIEF DESCRIPTION OF THE DRAWING

FIGURE 1 is a schematic illustration of two sections of butt welded, helically corrugated, spiral pipe, the ends of which are provided with annular corrugations in accordance with the teaching of the present invention.

FIGURE 2 is an illustration of a partially constructed pipe band of the present invention.

FIGURE 3 is a front and side elevational view of a pipe band constructed in accordance with the teaching of the present invention.

FIGURE 4 is a side elevational view, partially in section, showing a pipe joint constructed in accordance with the teaching of the present invention.

FIGURE 5 is an illustration of a modification of the pipe band, partially constructed, shown in FIGURE 2.

FIGURE 6 is an illustration of the modified structure shown in FIGURE 5 in place, and partially in section, on a pipe joint.

FIGURE 7 is an illustration of a further modification of the pipe band partially constructed, shown in FIGURE 2.

FIGURE 8 is an illustration of the further modified structure shown in FIGURE 7, in place, and partially in section, on a pipe joint.

FIGURE 9 is an illustration showing various tensioning means for use in connection with the pipe coupling of the present invention.

DESCRIPTION OF THE PREFERRED EMBODIMENTS

The improved pipe and pipe joint of the present invention are based on a new end treatment for helically corrugated, spiral pipe with butt welded seams. According to the present invention the ends of the helically corrugated, spiral pipe are rolled so as to form at least one annular corrugation at each end of the pipe, as shown in FIGURE 1. The annular corrugations will be roughly the same depth and width as the helical corrugations, the outside diameter of each annular corrugation being substantially identical with the maximum outside diameter of the helically corrugated, spiral pipe, and will permit a much more efficient coupling. In theory, the concept of forming the ends of helically corrugated, spiral pipe in the aforementioned manner is now possible because of butt welded seam. This is so because the conventional lock seam, welded or not, could not withstand the severe deformation such as this invention requires. The butt welded seam also presents a smooth surface as compared to the discontinuity of the multi-layer lock seam.

FIGURE 2 is an illustration of a partially constructed flat, tensionable pipe band 16 of the present invention. The band 16, as shown in FIGURE 3, is formed in a plane perpendicular to the axis of a pair of substantially axially aligned abutting lengths of helically corrugated pipe 10 and 12, the abutting ends of which are provided with at least one annular corrugation. It will be obvious that the band or coupling unit 16 may comprise one or more pieces as desired.

As will be more fully explained hereinafter, means, shown in FIGURE 9, are provided for tensioning the ends of the band 16 together. As can be seen in FIGURE 4, when the ends of the flat, tensionable band 16 are tensioned together so that the band encircles the adjacent ends of the substantially abutting lengths of butt welded, helically corrugated spiral pipes 10 and 12, a pipe joint is formed having a continuous surface to surface seal about the entire circumference of the abutting ends of the pipe. By surface to surface seal it is meant that the surface of the pipe and the inner surface of the band will be contiguous irrespective of the type of surfaces which are involved. This creates a soil tight coupling of the pipes. It should be emphasized that the band 16 has a predominantly flat cross section and that it is of a width to provide a continuous surface to surface seal about the entire circumference of each abutting length of pipe at at least two points thereon.

It will, of course, be obvious that the number of annular corrugations on the end of each butt welded, helically corrugated, spiral pipe, and the width of the flat band 16, except as specified previously, will depend upon the particular circumstances which are encountered.

FIGURE 5 is an illustration of a modification of the pipe coupling, partially constructed, shown in FIGURE 2. There the band 16a has been provided with a deformation near each circumferential edge thereof. The deformation comprises an annular corrugation 18 which engages the trough of an annular corrugation on the end of one of the abutting pipes when the band 16a is formed, as shown in FIGURE 6.

As can be seen from FIGURE 6, the annular corrugations 18 of the flat band 16a preferably engage with the troughs of the innermost corrugations 14 on the ends of the butt welded, helically corrugated, spiral pipe 10 and 12, respectively. This precludes the pipes 10 and 12 from pulling out of the coupling after the ends of the band 16a have been tensioned together.

It should be emphasized that the industry presently manufactures helically corrugated, spiral pipe having a standard nine helical corrugations irrespective of the diameter of the pipe. Accordingly, the prior art band deformations are limited to non-continuous indentations whose number corresponds to the number of helical corrugations; namely nine. The present invention, in providing the ends of butt welded helically corrugated, spiral pipe with annular corrugations, creates a pipe section having ends which are protected from crushing, and creates a pipe joint where the band 16, as will be more fully explained hereinafter, may contain any number of indentations.

It should also be pointed out that one of the problems which results when the deformations, such as the annular corrugations 18, conform to and fill the troughs of the annular corrugations 14 on the pipe that they engage, is that angular movement of the lengths of pipe 10 and 12 is substantially prevented. Such movement is generally desirable so that the lengths of pipe 10 and 12 will conform to the contour of the land on which they rest. The present invention allows such angular movement, from 3 to 5°, by not making the deformations, such as the annular corrugation 18, on the band 16a conform to the annular corrugations 14 on the ends of the pipes 10 and 12. However, water tightness of the pipe joint is maintained by using the resilient rings 20. The rings 20 are such that they stretch around the end of the spiral pipe and fit within any one of the annular corrugations 14. When the ends of the band 16a are tensioned together, the resilient rings 20 are such that they will not extrude out of their corrugations and such that they are contiguous with the inner surface of the band.

The resilient rings 20 are large enough in cross sectional configuration so that they extend above the surface of the pipes 10 and 12 and are small enough in cross sectional configuration so that a continuous surface to surface seal is provided about the entire circumference of each abutting end of the pipes 10 and 12, at at least two points thereon when the ends of the band 16a are tensioned together. The resilient rings 20 are preferably soft rubber O-rings, for example, rubber having a durometer number ranging from 20 to 60 Shore A, and the compression therein on the order of 15% to 50% will be substantially uniform about the entire circumference thereof. The hardness, cross section and percent compression are obviously interdependent. O-rings are also preferred for the resilient rings 20 because they are standard and non-complex, they offer no orientation problem, and they permit an increased shear transfer between the aforementioned surface to surface seal between the band 16a and th pipes 10 and 12. Other gasket shapes could easily be adapted for this use.

As shown in FIGURE 6, a band 16a, is provided with annular corrugations 18 which engage the innermost annular corrugation on the ends of the pipes 10 and 12. A resilient ring 20 is positioned in the first annular corrugation 14 on the end of each pipe 10 and 12.

FIGURE 7 is an illustration of a further modification of the pipe band, partially constructed, shown in FIGURE 2. Here the deformations near each circumferential edge of the band 16b comprise a plurality of indentations 22. As can be seen from FIGURE 8, when the band 16b is formed the indentations 22 engage one of the annular corrugations 14 on an end of the pipes 10 and 12. In order to make the pipe joint water tight, the resilient rings 20 may be positioned in an annular corrugation on each of the abutting pipe ends, as was previously explained.

It will, of course, be obvious that a plurality of rows of indentations 22 having any number of desired indentations per row may be utilized, the number of rows depending upon the number of annular corrugations on the end of each abutting pipe.

FIGURE 9 is an illustration showing various tensioning means for use in connection with the pipe joint of the present invention. It should be emphasized that any means which will satisfactorily tension the ends of the band 16 together to retain it in place and to provide a continuous surface to surface seal at at least two points about the entire circumference of the abutting end of each pipe may be utilized. However, according to the instant invention several tensioning means have been found to be preferable to the prior art expedient of joining the ends of a coupling band by using angles. There one leg of an angle is attached to each end of the band and the free legs are bolted together. Such tensioning means is unsatisfactory because a portion of the band raises off the abutting pipes when the free legs are bolted together, precluding a soil tight or water tight joint.

The means for tensioning the ends of the band 16 together may comprise at least one loop 24a and 24b attached to each end of the band 16. The loops 24a and 24b are attached to the band 16 far enough from the ends thereof so as to provide overlapping of the ends when the ends are tensioned together.

One exemplary coupling includes a bar member 26 located in each loop and bolt means 28 to join the bar members together. The bolt means 28 are preferable when relatively small diameter butt welded, helically corrugated, spiral pipe are being joined. A further exemplary coupling includes a U-shaped bolt 30 in lieu of one of the bar members 26. However, if small diameter pipes are being joined, the U-shaped bolt 30 must be curved to conform therewith. The bolt means 28 and the U-shaped bolt 30 are preferably positioned such that the line of tension therein is close to the surface of the band 16 when the ends thereof are tensioned together. This precludes the band from raising off the abutting pipes beneath the bolt means 28 or the U-shaped bolt 30.

While certain preferred embodiments of the invention have been specifically illustrated and described, it is understood that the invention is not limited thereto, as many variations will be apparent to those skilled in the art, and the invention is to be given its broadest interpretation within the terms of the following claims. For example, the means for tensioning the ends of the corrugated band 16a of FIGURE 5 together may comprise conventional encircling rods. Additionally, it will be understood that in order to preclude leakage across the coupling band between the resilient rings 20 in a water tight pipe joint, the lapped end of the band may be provided with a sealant, as is well known in the art.

What we claim is:

1. A structure comprising in combination at least two substantially axially aligned, abutting pipe sections and cooperating coupling means encircling the adjacent ends of said sections to provide a substantially soil tight joint therebetween, each said pipe section comprising a metallic, helically corrugated, spiral pipe, said pipe being continuously butt welded on a helical angle such that the outside surface thereof across said weld is smooth and free from discontinuities, each said pipe being provided at each end thereof with at least one annular, circumferentially continuous, corrugation, said helical corrugations extending from the innermost one of said annular corrugations on one end of said pipe to the innermost one of said annular corrugations on the other end of said pipe, the outside diameter of each said annular corrugation being substantially identical with the outside diameter of said helically corrugated, spiral pipe, the crests adjacent each said annular corrugation being adapted for sealing purposes and providing continuous surface to surface seals with said coupling means about the entire circumference of said pipe, said coupling means comprising a coupling band encircling the adjacent ends of said lengths of pipe and means for tensioning the ends of said band together, said band having a predominantly flat cross section and being of a width to provide said continuous surface to surface seals with the crests of said annular corrugations about the entire circumference of said abutting length of pipe at at least two points thereon.

2. The structure according to claim 1 wherein said band is provided with at least one deformation near each circumferential edge thereof which engages an annular corrugation on each of the adjacent, abutting ends of said pipe sections so that said pipe sections are precluded from pulling out of said coupling means.

3. The structure according to claim 2, wherein said deformations engage the innermost annular corrugation on the ends of said pipes.

4. The structure according to claim 3, wherein each said deformation comprises one annular corrugation.

5. The structure according to claim 2, wherein each said deformation comprises one row of indentations.

6. The structure according to claim 2, wherein a resilient ring is positioned in an annular corrugation on an abutting end of each of said pipes, said ring being such that it cannot extrude out of its corrugation and such that it is contiguous with the underside of said band when the ends of said band are tensioned together.

7. The structure according to claim 2, wherein said means for tensioning the ends of said band together comprise a loop attached to each end of said band, each said loop being provided with a bar member, and bolt means, the ends of said bolt means being received by said bar members.

8. The structure according to claim 7, wherein said loops are attached to said band far enough from the ends thereof so as to provide overlapping of said ends when the ends of said band are tensioned together.

9. The structure according to claim 8, wherein the line of tension in said bolt means is close to the surface of said band, whereby said band is precluded from raising off said pipes, when the ends of said band are tensioned together.

10. The structure according to claim 2, wherein said means for tensioning the ends of said band together comprise a loop attached to each end of said band, one loop being provided with a bar member and the other loop being provided with a U-bolt the ends of which are received by said bar member.

11. The structure according to claim 10, wherein said loops are attached to said band far enough from the ends thereof so as to provide overlapping of said ends when the ends of said band are tensioned together.

12. The structure according to claim 11, wherein the line of tension in said U-bolt is close to the surface of said band, whereby said band is precluded from raising off said pipes when the ends of said band are tensioned together.

13. A metallic, helically corrugated, spiral pipe for use with coupling means to provide a substantially soil tight joint, said pipe being continuously butt welded on a helical angle such that the outside surface thereof across said weld is smooth and free from discontinuities, said pipe being provided at each end with at least one annular, circumferentially continuous, corrugation, said helical corrugations extending from the innermost one of said annular corrugations on one end of said pipe to the innermost one of said annular corrugations on the other end of said pipe, the outside diameter of each said annular corrugation being substantially identical with the outside diameter of said helically corrugated, spiral pipe, the crests adjacent each said annular corrugation being adapted for sealing purposes and providing continuous surface to surface seals with said coupling means about the entire circumference of said pipe.

References Cited

UNITED STATES PATENTS

| | | | |
|---|---|---|---|
| 458,994 | 9/1891 | Bieber | 285—424 X |
| 1,839,761 | 1/1932 | Hutton | 285—419 X |
| 2,095,702 | 10/1937 | Johnson | 138—120 |
| 2,787,442 | 4/1957 | Lewis. | |
| 2,821,768 | 2/1958 | Beckham et al. | |
| 3,028,290 | 4/1962 | Roberts et al. | 138—122 X |
| 3,131,954 | 5/1964 | Kramer et al. | 138—109 X |
| 3,239,254 | 3/1966 | Campbell. | |
| 3,298,721 | 1/1967 | Wiley | 285—424 |

FOREIGN PATENTS

| | | |
|---|---|---|
| 769,622 | 10/1967 | Canada. |
| 1,488,423 | 6/1967 | France. |
| 349,784 | 12/1960 | Switzerland. |

THOMAS F. CALLAGHAN, Primary Examiner

U.S. Cl. X.R.

138—109; 285—424